N. D. MUNN.
MECHANICAL STARTER FOR AUTOMOBILES.
APPLICATION FILED MAR. 12, 1917.
1,237,803.
Patented Aug. 21, 1917.
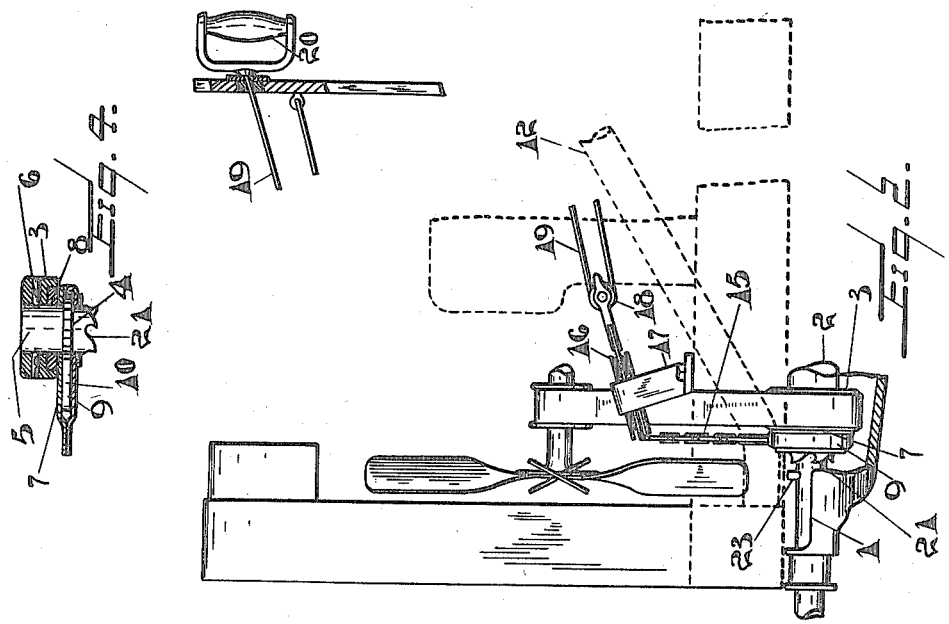
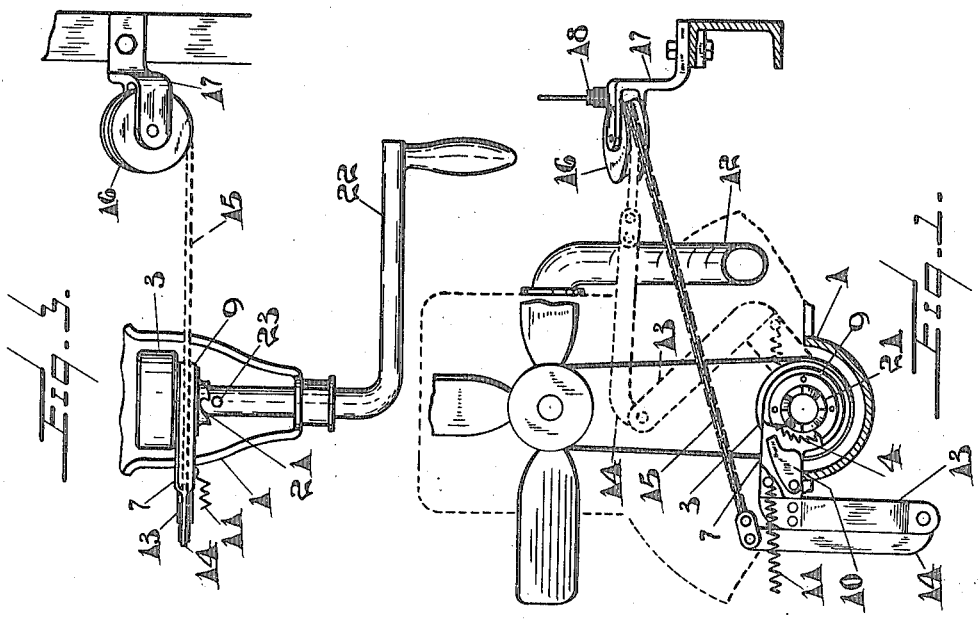
WITNESSES.
N. R. Tyndall.
INVENTOR.
N. D. Munn.
BY J. Edward Maybee.
ATTY.

UNITED STATES PATENT OFFICE.

NEIL D. MUNN, OF DRESDEN, ONTARIO, CANADA.

MECHANICAL STARTER FOR AUTOMOBILES.

1,237,803.  Specification of Letters Patent.  Patented Aug. 21, 1917.

Application filed March 12, 1917. Serial No. 154,227.

*To all whom it may concern:*

Be it known that I, NEIL D. MUNN, of the town of Dresden, in the county of Kent, Province of Ontario, Canada, have invented certain new and useful Improvements in Mechanical Starters for Automobiles, of which the following is a specification.

This invention relates to starters of the type which are operable from the driver's seat and utilize the manual power of the driver to turn over the crank shaft, and my object is to devise a starter of this type which may be operated with a comparatively small expenditure of effort, will give at least two compressions on a four-cylinder car and which is particularly adapted for cars of the "Ford" type.

I attain my object by means of the constructions hereinafter described and illustrated in the accompanying drawings in which—

Figure 1 is a front elevation showing parts of an automobile with my device in position, parts of the device being broken away to expose the internal construction;

Fig. 2 a view of the same parts in side elevation, showing also part of the dash of the automobile;

Fig. 3 a plan view of the parts shown in Fig. 1; and

Fig. 4 a sectional detail of the ratchet wheel and dog of the starter mechanism.

In the drawings like numerals of reference indicate corresponding parts in the different figures.

The device is illustrated as applied to a "Ford" motor car, for which it is particularly adapted. 1 is the forward part of the bed of the motor and 2 the crank shaft of the motor. 3 is the drive pulley for the fan, with which is combined the ratchet wheel 4. This ratchet wheel is provided with a sleeve 5 fitting within the drive pulley and secured thereto by a pin 6, which also passes through the crank shaft, thus giving the ratchet wheel a drive connection with the crank shaft.

7 is a lever formed with a bearing 8 fitting over the sleeve 5 and into a recess formed in the forward face of the drive pulley. The lever may thus have a rotary movement concentric with the ratchet wheel. The lever is preferably double as shown, the outer part 9 having a bearing on the forward extension of the sleeve 5. The outer part 9 forms a cover for the dog 10, which is pivoted between the two parts of the lever and normally tends by gravity to engage the ratchet wheel 4.

When the lever is in its normal position this dog engages a suitable stationary part, in the case of a Ford car the upper edge of the forward part of the bed 1 of the motor, thus throwing the dog out of mesh with the ratchet wheel as shown. The lever is drawn to this position by means of a coil spring 11 secured at one end to the lever and at the other to a suitable stationary part of the automobile.

Owing to the location of the outlet connection pipe 12 of the cooling system of the motor, it is impossible with a radially extended lever of any length to secure a sufficient rotation of the ratchet wheel 4 to secure full compression in two cylinders of the motor. I have overcome this difficulty, however, by using a combined bent and folding lever of the form I will now describe. To the parts 7 and 9 of the lever, I secure a part 13 so that the lever, including the part 13, is of an L-shape, the part 13 normally extending downward as shown. The end of the part 13 is forked to form jaws between which I pivot the bent end of the folding extension 14. When the parts are in normal position the extension 14 lies parallel to and in contact with the part 13, while it is free to swing outwardly relative to the part 13.

To the free end of the folding extension 14 is secured one end of a cable 15. This may be a cord, chain or flexible wire as may be deemed best. This cable is led through a suitable guide pulley 16 carried by brackets 17 secured to the side frame of the chassis of the automobile. To the end of this cable I secure a pulley block 18. Through this pulley is rove a second cable 19, one end of which is secured to a stationary part while the other passes through the dash of the automobile and has the handle 20 secured thereto. By this construction of the actuating means for the lever of the starter I halve the strength of the pull necessary to operate the starter and, with the starter proportioned as shown, secure sufficient rotation for two compressions with a movement of the handle 20 of about 22 inches.

The operation of the device is substantially as follows: The parts are normally in the position shown in full lines in Fig. 1. During the first stage of the movement of the folding bent lever, the pivoted extension acts as if it were part of the downwardly extending part 13. At this stage the amount of power required to turn the crank shaft is least and great leverage is not required. It will be noted that the first result of moving the folding bent lever of the starter is to draw the dog 10 out of contact with the bed 1 and thus allow it to engage with the ratchet wheel 4.

As the movement of the bent lever continues, the extension 14 begins to unfold, thus shifting the draft to the end of the part 13 as shown in dotted lines in Fig. 1. The leverage is thus materially increased as the compression against which the starter is working is increased. A further result of the construction is that the part 7 of the lever can pass between the crank shaft and the outlet connection pipe 12, so that at least two full compressions of the motor can be obtained, which could not be done with a substantially straight radially extended lever. One pull under normal conditions will start the car. If it does not, the pull may be repeated quickly two or more times and the necessary result attained.

I find that the crank shaft can, with this starter, be turned much more quickly than with the crank and the start thus made more certain. In case of a back fire the lever will fly back and the dog will disengage itself automatically by contact with the bed 1, thus avoiding any damage to the apparatus.

The handle 20 will be located at any desired part of the dash convenient to either the right or left hand of the operator according as the car has right hand or left hand control.

It is desirable, of course, to retain the starting crank, but in my arrangement it is necessary to somewhat alter the arrangement of the same to enable it to be used with my device. I therefore omit the usual starting pin of the fan drive pulley of the Ford car and form a crown ratchet on the outer end of the sleeve 5. The ratchet teeth of the ordinary crank handle 22 are omitted and a pin 23 substituted therefor, which pin may be engaged with the crown ratchet 21 in the ordinary way when it is desired to crank the car.

From the above description it will be seen that I have devised a mechanical starter which will satisfactorily attain the objects of my invention as set out in the preamble to this specification.

What I claim as my invention is:—

1. An automobile starter comprising a ratchet wheel secured to the crank shaft of the motor; a lever journaled substantially concentric with the ratchet wheel and bent sharply in a backward direction having reference to the direction of motion of the crank shaft; a lever extension pivoted at the outer end of the bent lever normally folded back on said lever and limited in its movement in the direction of the lever; and a dog carried by the lever and engaging the ratchet wheel.

2. An automobile starter comprising a ratchet wheel secured to the crank shaft of the motor; a folding extensible lever journaled at one end concentric with the ratchet wheel; an operating cable attached to the outer end of the lever; and a dog carried by the lever and engaging the ratchet wheel.

3. An automobile starter comprising a ratchet wheel secured to the crank shaft of the motor; a lever journaled concentric with the ratchet wheel; a dog carried by the lever normally engaging the ratchet wheel and adapted, when the lever is in normal position, to engage a stationary part and release itself from the ratchet wheel.

Signed at Toronto, Canada, this 1st day of March, 1917.

NEIL D. MUNN.